United States Patent [19]

Barry

[11] Patent Number: 5,063,983
[45] Date of Patent: Nov. 12, 1991

[54] ROUTER TABLE WITH SWING ARM MEASURING SCALE, BLOCK AND METHOD

[76] Inventor: David Barry, 49 Lomita Dr., Mill Valley, Calif. 94941

[21] Appl. No.: 535,727

[22] Filed: Jun. 11, 1990

[51] Int. Cl.⁵ .............................................. B27F 1/06
[52] U.S. Cl. ....................................... 144/371; 83/439; 83/522.11; 83/574; 144/134 A; 144/136 R; 144/253 R; 144/253 J; 144/286 A; 269/303; 269/307
[58] Field of Search ................. 269/303, 304, 307; 144/134 A, 253 R, 253 J, 136 R, 286 A; 83/438, 439, 445, 522.1, 574

[56] References Cited

U.S. PATENT DOCUMENTS

| | | | |
|---|---|---|---|
| 1,789,125 | 1/1931 | Wilderson | 144/253 |
| 2,594,651 | 4/1952 | Jackson | 144/253 R |
| 2,799,305 | 7/1957 | Groehn | 144/253 R |
| 2,916,063 | 12/1959 | Boekenkamp | 144/198 A |
| 4,693,158 | 9/1987 | Price | 144/253 R |
| 4,741,370 | 5/1988 | Heaton | 83/574 |

Primary Examiner—W. Donald Bray
Attorney, Agent, or Firm—Phillips, Moore, Lempio & Finley

[57] ABSTRACT

This invention relates to a router table comprising a horizontal platen having a central opening formed therethrough to receive a router bit. A fence is pivotally mounted on the platen to guide movements of a workpiece therealong for engagement with the router bit. The fence is thus adapted to be pivoted to a selected position on the platen. A scale is mounted along one edge of the platen to underlie an end of the fence. The operator can thus visually note the precise distance between the router bit and the fence when the fence is pivoted to a selected position on the platen. The fence and attendant components of this invention can be sold as an adapter kit to modify a conventional router table or work bench for use with the pivoted fence, and/or scale a micro-adjustment mounting block. A method for making a router table or adapting an existing router table to accommodate the pivoted fence is also described herein.

42 Claims, 3 Drawing Sheets

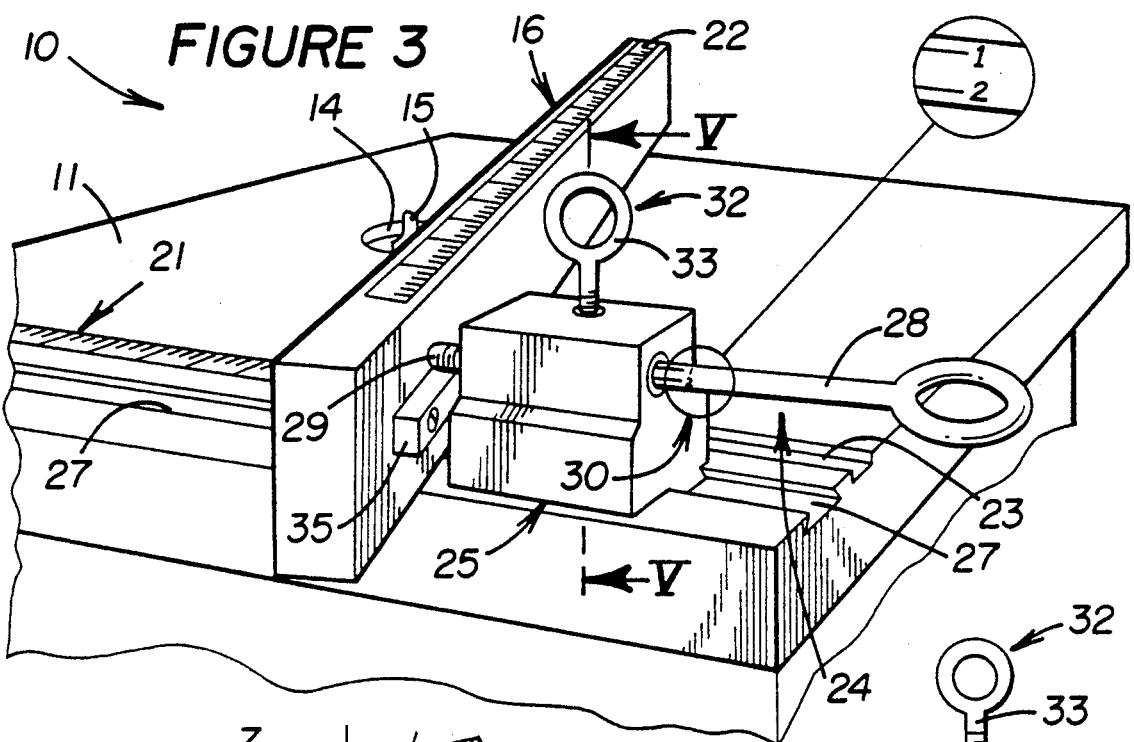
FIGURE 3
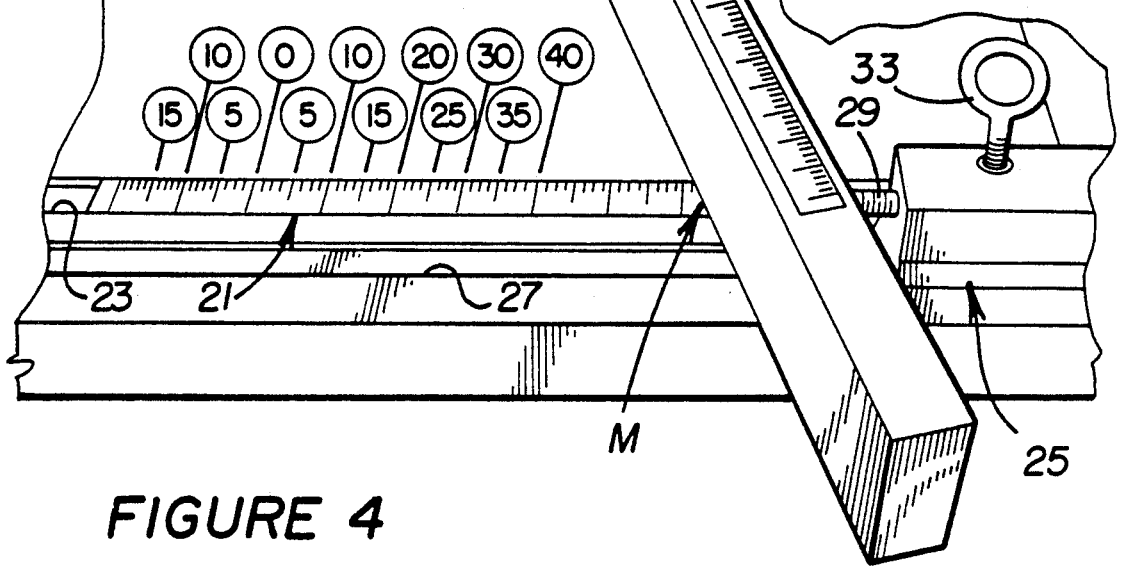
FIGURE 5
FIGURE 4

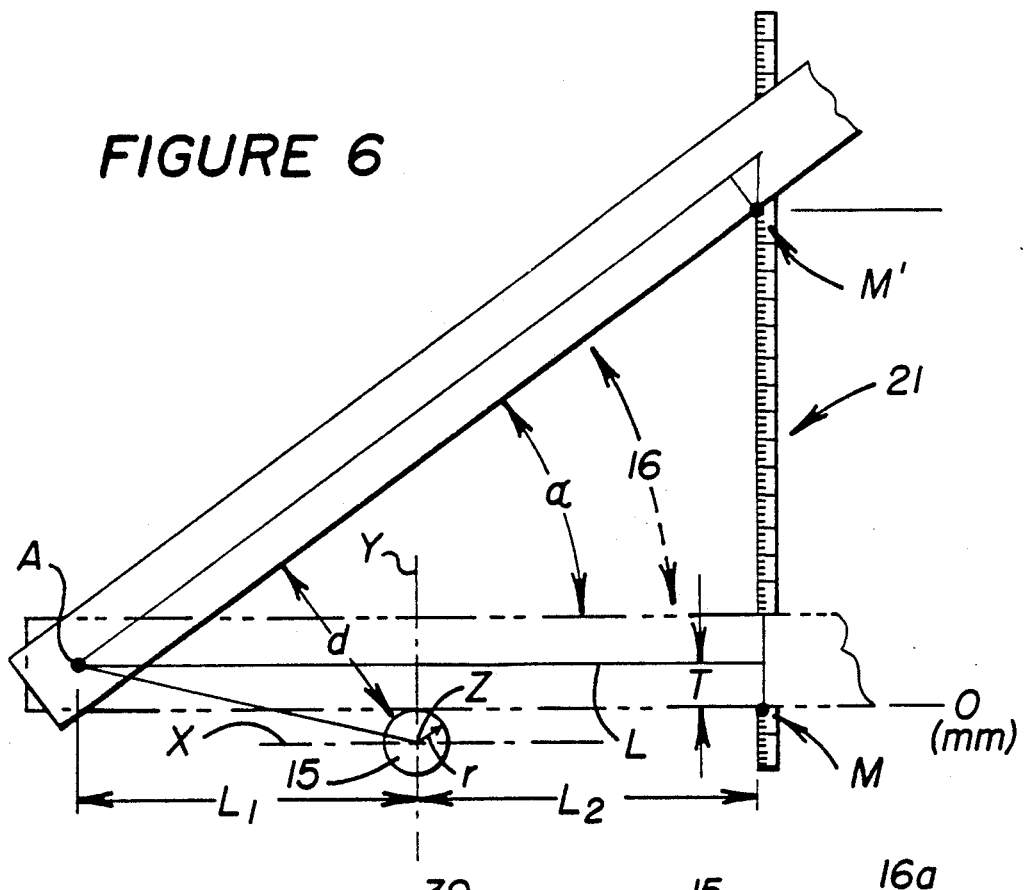
FIGURE 6
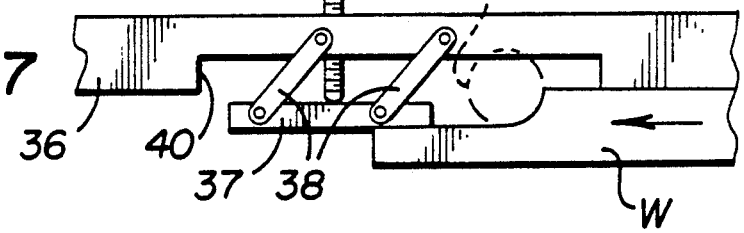
FIGURE 7
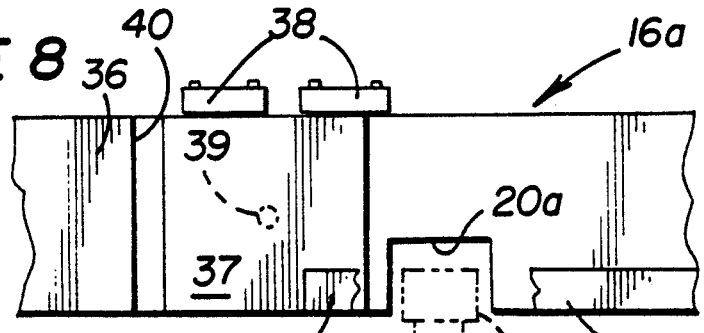
FIGURE 8
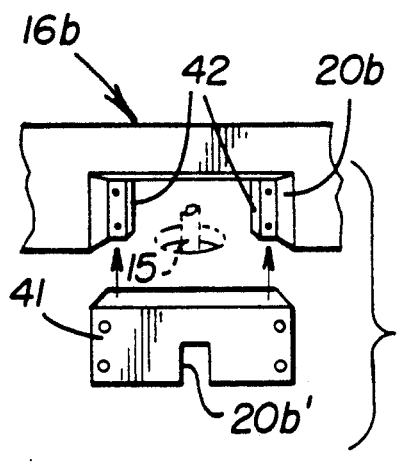
FIGURE 9
FIGURE 10

ROUTER TABLE WITH SWING ARM MEASURING SCALE, BLOCK AND METHOD

TECHNICAL FIELD

This invention relates generally to a router table and more particularly to a router table having a fence pivotally mounted thereon.

BACKGROUND OF THE INVENTION

Electric routers are the most versatile of all power-driven woodworking machines. A router bit is capable of speeds in the range of from 20,000 to 30,000 rpm and enables the non-professional to turn out work that once was strictly in the province of a master cabinetmaker. In particular, the router is capable of making the most intricate joints, decorative cuts and exacting inlays with a high degree of accuracy. In short, a router is the secret for achieving sophisticated professional touches on wood products that are impossible to duplicate with the use of any other tool.

In order to extend the capability of a router. Tables can be purchased to convert the router to a spindle shaper. In particular, the router is normally mounted below the table to have its router bit extend through an opening formed through the top working platen of the table. This arrangement frees the operator's hands for better control of the workpiece and allows operations that would otherwise prove impossible by use of a portable or hand-held router.

Various improvements have been made to router tables over the years, including the provision of means for tilting the platen of a router table relative to the rotational axis of the router bit. Routers have also been mounted on a table to swing in an arcuate manner. U.S. Pat. Nos. 3,604,484 and 4,741,370 disclose other types of router tables that have adjustments for the purpose of aiding the operator. In particular, such improvements are primarily intended to increase his or her capacity to perform various work tasks with greater accuracy.

Conventional router tables of the above type are generally expensive to purchase and maintain, complicated to adjust and manipulate and do not always provide the high degree of accuracy required for many sophisticated work tasks.

SUMMARY OF THE INVENTION

An object of this invention is to provide an improved and economical router table that will insure a high degree of accuracy, speed, safety and convenience for work performed thereon.

The router table comprises a platen having an opening formed therethrough for receiving a router bit, adapted to project vertically above the upper surface of the platen. A fence is pivotally mounted on the platen for guiding movements of a workpiece therealong. The fence can be pivoted to various positions on the platen to selectively vary and adjust the distance between the router bit and the fence. A primary scale may be provided on the platen for visually indicating and closely approximating such distance.

In another aspect of this invention, an adapter kit is provided for either converting an existing work table for use with the pivoted fence or enable a purchaser to build his or her own router table, utilizing the pivoted fence.

In another aspect of this invention, a method is taught for making a router table or adapting an existing router table to accommodate the pivoted fence teachings of this invention.

BRIEF DESCRIPTION OF THE DRAWINGS

Other objects and advantages of this invention will become apparent from the following description and accompanying drawings wherein:

FIG. 3 is a partial perspective view of a portion of the router table to illustrate a micro-adjustment for the fence;

FIG. 4 is another partial perspective view of the router table also illustrating the relative positions of the fence and its micro-adjustment;

FIG. 5 is a sectional view through the microadjustment and a stop mechanism for releasably securing the micro-adjustment at a set position on the table, the view being taken in the direction of arrows V—V in FIG. 3;

FIG. 6 is a diagram illustrating parameters used to compute the primary measuring scale;

FIG. 7 is a partial top elevational view of a modified fence having a portion adapted to be adjusted to accommodate a workpiece W;

FIG. 8 is a front elevational view of the adjustable fence of FIG. 7;

FIG. 9 is an exploded front perspective view illustrating a replaceable insert for an opening formed through the fence to accommodate a router bit; and FIG. 10 is an isometric view illustrating a carriage block adapted to move a small workpiece W through a router bit.

DETAILED DESCRIPTION

Figure 1:
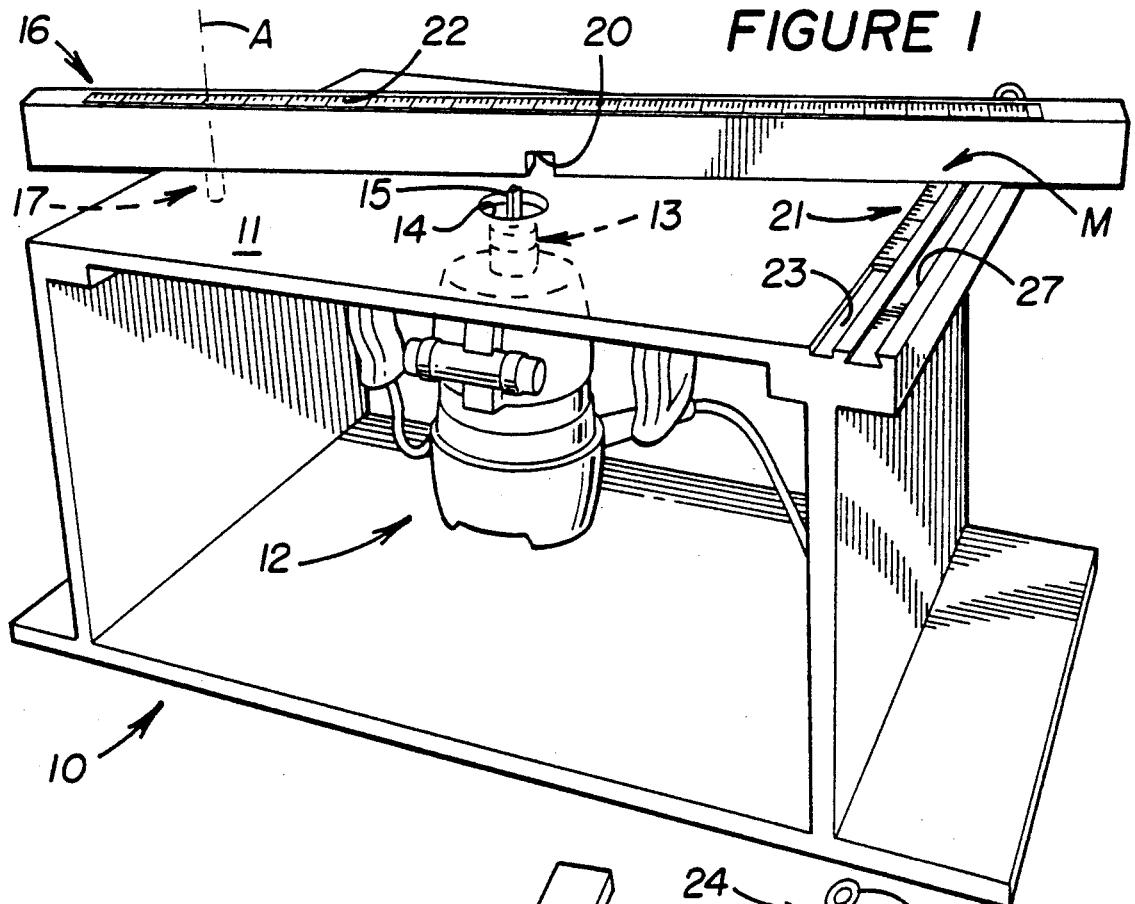
FIG. 1 is a front perspective view of a router table employing the pivoted fence and a primary measuring scale of this invention thereon.

Referring to FIG. 1, a router table 10 comprises a platen 11 forming a horizontally disposed upper work surface thereon. A router 12 is suitably mounted in a fixed position below the platen to rotate a chuck 13 thereof in a conventional manner. An opening 14 is formed generally centrally through platen 11 to receive a router bit 15 therethrough. The router bit is releasably secured in chuck 13 to project vertically above the upper surface of the platen, as shown in FIGS. 1 and 2.

A fence 16 is mounted on the upper surface of platen 11 for guiding movements of a workpiece therealong and on the upper surface of the platen for engagement with router bit 15. A pivot means 17 mounts one end of the fence for pivotal or swinging movement about a vertically disposed axis (A) on the upper surface of the platen. Briefly referring to FIG. 4, it can thus be seen that the fence is adapted to be pivoted on the platen to selectively vary an acute angle ($\alpha$) and to simultaneously adjust a variable distance (d) between a cutting edge of router bit 15 and an edge of the fence.

Figure 2:
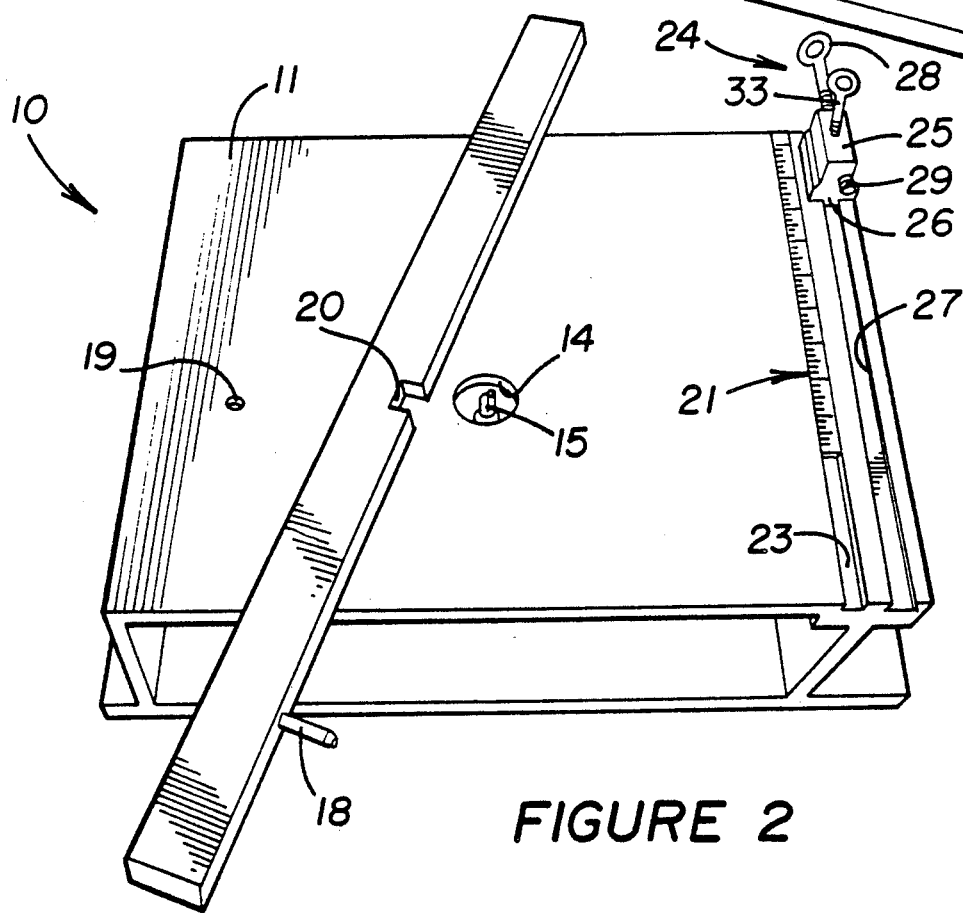
FIG. 2 is a top perspective view of the router table, showing the fence disassembled therefrom.

As shown in FIG. 2, pivot means 17 comprises a pivot pin 18, preferably in the form of a wood or plastic dowel rod secured adjacent to one end and on the bottom side of the fence. A hole 19 is formed in platen 11, adjacent to one side thereof. Pin 18 is pivotally and snugly mounted in the hole to accommodate selective swinging movement of the fence on the platen. Referring to FIGS. 1, a slot 20 is arcuately aligned with opening 14 and router bit 15 to define an open window through the fence between opposite ends thereof to permit swinging movements of the fence member over the router bit without interference.

A primary scale 21 is positioned on a side of platen 11 and transversely relative to the fence and a secondary scale 22 is formed on fence 16. The primary scale will visually indicate and closely approximate the distance d (FIG. 6) between the cutting edge of router bit 15 and an edge of fence 16 at a read-out point M or M' located at a forward edge of the fence that overlies the scale. The fact that distance d is a known function of angle $\alpha$ has enabled applicant to provide a very accurate scale.

In particular, the scale is suitably calibrated (e.g., in mm.), as described hereinafter, to permit the user to visually note variable distance d when the fence is pivoted to various positions on platen 11. As shown by the enlarged, circled calibrations in FIG. 4, the "O" indicia is intermediate scaled increments (in mm.) on each side thereof to accommodate the positioning of fence 16 on either side o the cutting edge of router bit 15. Primary scale 21 has a ruler-like construction and is slidably mounted and closely fitted within a straight groove 23, formed in platen 11. The upper flat surface of the primary scale is flush with the upper surface of platen to accommodate the swinging movements of the fence on the platen.

Referring to FIGS. 2-5, a micro-adjustment 24 is mounted on platen 11 to selectively pivot swing arm or fence 16 about pivot means 17 to slightly vary read-out point M and the relative position of the fence on primary scale 21. The "leverage factor" of the swing arm mechanism can be thought of as the ratio $L_1 + L_2/L_1$ (FIG. 6). For example, if $L_1 = 100$ cm. and $L_2 = 200$ cm., the leverage factor is 3. Thus, a linear of 0.3 mm. of set screw 28 will cause a change of only 0.1 mm. in distanced d. The swing arm mechanism and associated micro adjustment will thus achieve closer tolerances then ever before achieved by conventional adjustments and methods.

The micro-adjustment is mounted on the platen by a mounting block 25, slidably mounted in guide means for linear movements parallel to scale 21. The guide means for mounting the block on the platen for may comprise a dovetail 26 formed on the lower end of the block and disposed in a closely fitted mating groove 27 formed on the platen (FIG. 5).

As further shown in FIGS. 3-5, micro-adjustment 24 comprises a horizontally disposed set screw 28 threadably mounted in block 25 to normally have a distal end 29 thereof engage a backside of fence 16. The set screw will thus hold the fence at a set position over scale 21 and is adapted to be turned to the pivot fence slightly for final (micro) adjustment and fixing of point M (FIG. 4). Circumferentially disposed markings are formed on set screw 28 to provide a micro-scale 30 (partially shown in the enlarged circle in FIG. 3) for visually indicating the slightly varied pivoted position of the fence.

As a typical example, it will be assumed that each full turn of set screw 28 (through 360°) will advance the screw linearly 1.0 mm. and that the leverage factor is 3. The micro-scale could constitute ten equally spaced markings so that turning of the set screw approximately 0.1 mm. (36°) would move the fence about 0.03 mm. closer to or away from the router bit, depending on the direction of rotation of the set screw. A standard spring-biased detent (not shown) could be used between mounting block 25 and set screw 28 to index and hold each of the ten rotational settings.

As further shown in FIGS. 3 and 5, a locking mechanism 32 is provided for releasably securing mounting block 25 in a set position on platen 11. In the embodiment illustrated, the locking mechanism comprises a vertically disposed set screw 33 threadably mounted in the block. A "turning-down" of the set screw will engage the distal end thereof within groove 27 to releasably secure the block in a set position relative to the platen.

In particular, the distal end of set screw 33 has a cylindrical elastomeric or wooden bushing 34 secured thereon adapted to frictionally engage the flat surface defining the bottom surface defining groove 27. Mounting block 25 will be forced upwardly whereby outer tapered surfaces of dovetail 26 will frictionally engage the opposed tapered surfaces defining groove 27, upon rotation of the set screw in the appropriate direction to turn it down. Rotation of the set screw in the opposite direction will release distal end 34 of the set screw from the bottom surface defining groove 27 to thus permit mounting block 25 to be moved to another position along the groove.

As shown in FIG. 3, a stop member 35 is secured on a backside of fence 16 to underlie distal end 29 of set screw 28. This arrangement will prevent vertical upward movement of the fence relative to platen 11 during a work task. The stop member may comprise a suitably formed piece of wood secured to the backside of the fence by screws or the like. Since the operator will engage a workpiece against the frontal side of fence 16 during a cutting operation, normally no stop means is required to hold the fence against leftward movement in FIG. 4, i.e., the pressure applied to the fence will hold it against end 29 of set screw 28.

As shown in FIGS. 4 and 6, the horizontally disposed upper or working surface of platen 11 has imaginary X and Y axes intersecting each other in perpendicular relationship. Opening 14 and router bit 15 are centered on an imaginary Z axis, parallel to pivot axis A of fence 16 (FIGS. 1 and 6). The fence thus defines selectively variable acute angle $\alpha$ relative to axis X and approximately proportional to distance d (FIG. 6).

Distance d is visually depicted by graduated linear numerical scale indicia on primary scale 21. The scale can be plotted in accordance with the formula $$d = (L_1 + L_2) \text{ TAN } \alpha - T/\text{COS } \alpha + T - r \text{ wherein:}$$

$L_1$ = The linear distance on the X axis between the center of pivot axis A for fence 16 and the Z axis;

$L_2$ = The linear distance between the Z axis and scale 21;

$\alpha$ = The acute angle of rotation of the fence 16;

T = One-half of the thickness of fence 16, taken in a horizontal plane; and r = The radius of router bit 15, centered on the Z axis.

Referring to FIG. 6, fence pivot axis A intersects an imaginary line L that is parallel to axis X and line L is separated from axes X and Z by a distance equal to T (one-half the thickness of fence 16) plus r (the radius of router bit 15). Primary scale 21 is mounted on one side of platen 11 in parallel relationship relative to axis Y with the scale's indicia being calibrated in millimeters and underlying fence 16 to clearly mark read-out point M (FIG. 6). To read correctly, the scale must be adjusted linearly in groove 23 (FIG. 4) to initially set the zero (0) reading when fence just touches the cutting edge of the router bit.

In one workable embodiment of scale 21, the markings were calibrated in millimeters with the range between each major increment of ten millimeter (e.g., 0 to 10 mm.) progressively increasing in physical distance towards the high end of the scale. For example, the 40-50 mm. increment range on the scale reflected an increase of one small marking (1 mm.) over the 0-10 mm. range.

FIG. 6 shows a typical zero (0) reading and read-out point M set on the frontal side of fence 16 (and the outer surface of router bit 15) which is parallel to axis X. As further shown in FIG. 4, the scale is graduated identically on each side of the zero (0) setting to provide the same visual read-out when fence 16 is positioned on the rightside of router bit 15 or pivoted clockwise to a position partially covering the router bit. As described above, screw 29 can be turned by the operator to pivot the fence in micro-increments to provide final finite adjustment of the fence and separation distance d whereafter block 25 is fixed on the platen by turning-down locking screw 33.

The calculations required to determine d and point M are based on a variety of parameters about the router table, all of which are fixed except the radius of the router bit. When the user changes the router bit, that will alter the formula for d, the distance between the fence and the router bit using a value of $r=3$ in the formula provides current values of M and d, as a function of $\alpha$. For other values, the value of M will differ slightly to create an error ($M=0$).

If the radius of the cutter head r is systematically changed in a spread sheet, then a sensitivity analysis of d as a function of r can be obtained. That sensitivity table is shown below for the value of d at the highest point of the table, when d would be 100 and r 3. All values are in millimeters (mm.).

| r | d | Error - (computed as the difference between the computed value of d and the scale indication of M) |
| --- | --- | --- |
| 2.5 | 100.1 | 0.1 |
| 3 | 100 | 0 |
| 4 | 99.9 | 0.1 |
| 5 | 99.8 | 0.2 |
| 6 | 99.7 | 0.3 |
| 7 | 99.6 | 0.4 |
| 8 | 99.5 | 0.5 |
| 9 | 99.4 | 0.6 |
| 10 | 99.3 | 0.7 |
| 11 | 99.1 | 0.9 |
| 12 | 99.0 | 1.0 |
| 13 | 98.9 | 1.1 |
| 14 | 98.8 | 1.2 |
| 15 | 98.7 | 1.3 |

To minimize these errors, the table's sliding scale 21 could have two sides, each one printed with different scales. One of the scales would assume a radius of the cutter head of 3 mm., and the other would assume a radius of for example, 10 mm., for example. That way, errors would usually be under 0.5 mm., which is acceptable for most woodworking tasks. Micro-adjustment 24, with its screw adjustment, will allow finer accuracy settings of up to 0.1 mm., or even finer.

FIGS. 7 and 8 illustrate a modified fence 16a comprising a fence member 36 having a flat, rectangular fence portion 37 adjustably mounted thereon. The fence portion is disposed linearly between pivot means 17 (FIG. 1) and router 15 for selective adjustment and fixing of the fence portion at a fixed position, parallel to a flat frontal side of fence member 36. The adjustment means comprises a pair of links 38, pivotally interconnected between fence member 36 and fence portion 37 to form a parallelogram linkage to maintain them in parallel relationship relative to each other.

A set screw 39 is threadably mounted on fence member 36 and has a distal end thereof engaged behind fence portion 37 (FIG. 7) to provide adjustment means to position fence portion 37 at a set position. Thus, when a workpiece W is moved leftwardly to be cut by router bit 15, as shown by the arrow in FIG. 8, the leading end of the workpiece will be permitted to engage and slide on fence portion 37. A slot 40 is formed on the frontal side of fence member 36 to accommodate fence portion 37, when it's retracted, and a standard window 20a is formed through the fence member to accommodate router bit 15.

FIG. 9 illustrates another alternative fence 16b having a removable and replaceable insert 41 adapted to be mounted in a rectangular primary window 20b. A pair of parallel blocks 42 provide locating and mounting means for having the insert secured thereto by a plurality of wood screws (not shown). A secondary window 20b' is formed through insert 41 to accommodate router bit 15. The primary advantage of using a fence with a replaceable insert is that the entire fence need not be replaced when the insert is damaged beyond use, such as when using a succussion of router bits 15 that have varied sizes. Alternatively, a series of the inserts, having different sized windows 20b, could be utilized to accommodate a series of router bits having different shapes and sizes.

FIG. 10 illustrates a carriage block 43 having a small workpiece W secured thereunder by wood screws 44. The carriage block comprises an upper or guide block 45 having a lower or mounting block 46 secured thereunder. The carriage block solves the problem that occurs when very small pieces of wood are being handled.

The danger is that when hands are used to hold the small piece of wood, it brings the fingers dangerously close to router bit 15. In addition, because of the lack of a split fence, there is a certain "jump" that occurs when the small piece slides across the window around the router bit. Even when the split fence of FIG. 7 is used, there will still be a window which could cause a "jump" in the movement of the workpiece.

Screws 44 attach workpiece W to block 45 from below the workpiece. If it is preferred that the screws not penetrate through the workpiece, then screws 44 may enter block 45 from above and terminate midway within the workpiece. Positioning of the screws, as shown in FIG. 10, could be important for aesthetic considerations.

It should be noted that the width of guide block 45 is wider then block 46 to form a solid flat piece of wood that rides against the fence and above the window (not shown). Thus, there is no jog when the workpiece moves past the window. The fence continues its operations, as before, with the screw adjustments on mounting block 25 (FIG. 3) working the same with the carriage block as when no carriage block is used. Applicant has found that the carriage block greatly assists him when working with small pieces of wood. It adds a safety factor and a controllability level that is impossible to achieve in any other way.

I claim:
1. A router table comprising a platen forming a horizontally disposed upper surface thereon, opening means formed through said platen for receiving a router bit therethrough projecting vertically above said upper surface, fence means, comprising an elongated fence, mounted on the upper surface of said platen for guiding movements of a workpiece therealong and on said upper surface for engagement with said router bit, and pivot means for removably mounting said fence means of said platen for pivotally mounting said fence means for swinging movement about a vertical pivot axis on the upper surface of said platen to selectively vary and adjust the distance between said opening means and said fence means, said pivot means comprising a pivot pin mounted on said fence and a hole formed in said platen and wherein said pivot pin is pivotally mounted in said hole.

2. The router table of claim 1 further comprising slot means, arcuately aligned with said opening means to define an open window through said fence between opposite sides thereof, for permitting swinging movement of said fence over said upper surface and across said opening means without interfering with said router bit.

3. The router table of claim 2 further comprising a replaceable insert removably mounted on said fence and defining said slot means therein.

4. The router table of claim 1 further comprising primary scale means movably mounted on said platen for visually indicating and closely approximating the distance between said router bit and said fence means when said fence means is pivoted about said pivot axis to various positions on said platen, said opening means being positioned between said pivot means and said scale means.

5. The router table of claim 4 wherein the horizontally disposed upper surface defined on said platen has imaginary horizontal X and Y axes intersecting each other in perpendicular relationship and said opening means is centered on an imaginary vertical Z axis, parallel to said pivot axis, intersecting said X and Y axes in perpendicular relationship therewith, said fence means defining a selectively variable acute angle relative to said X axis and nearly proportional to the distance between said fence means and said Z axis in a response to pivoting of said fence means to its various positions about said pivot axis on said platen.

6. The router table of claim 5 wherein the distance (d) between said fence means and said Z axis is visually depicted by graduated linear scale indicia means on said scale means that is plotted in accordance with the formula $$d = (L_1 + L_2) \tan \alpha - T/\cos \alpha + T - r \text{ wherein:}$$

$L_1$ = The linear distance on the X axis between the center of the pivot means for the fence means and the Z axis;

$L_2$ = The linear distance between the Z axis and the scale means;

$\alpha$ = The acute angle of rotation of the fence means;

$T$ = One-half of the thickness of the fence means, taken in said horizontal plane; and $r$ = The radius of said router bit, centered on the Z axis.

7. The router table of claim 6 wherein said pivot axis intersects an imaginary line parallel to said X axis at a point separated from said Z axis by a distance totalling the sum of T and r.

8. The router table of claim 5 wherein said scale means comprises an elongated scale movably mounted on at least one side of said platen in parallel relationship relative to said Y axis and said scale has graduated linear scale indicia thereon underlying said fence means.

9. The router table of claim 8 further comprising means for linearly adjusting said scale on said platen.

10. The router table of claim 1 further comprising micro-adjustment means for selectively pivoting said fence means about said pivot means to slightly vary the position of said fence means relative to said router bit and mounting means for mounting said micro-adjustment means on said platen.

11. The router table of claim 10 wherein said mounting means comprises a block and guide means for mounting said block on said platen for linear movements parallel relative to said Y axis.

12. The router table of claim 11 further comprising locking means for releasably securing said block in a set position on said platen.

13. The router table of claim 12 wherein said micro-adjustment means comprises a set screw threadably mounted in said block and having a distal end thereof normally abutting a backside of said fence means to hold said fence means at a set position and further comprising micro scale means on said set screw for visually indicating slight chances in the position of said fence means.

14. The router table of claim 13 wherein said locking means comprises set screw means mounted in said block for selectively engaging within said guide means to releasably secure said block in a set position on said platen.

15. The router table of claim 13 further comprising stop means on the backside of said fence means and underlying the distal end of said set screw for preventing vertical upward movement of said fence means relative to said platen.

16. The router table of claim 1 further comprising a router removably mounted beneath said platen and having chuck means centered relative to said opening means for releasably securing a said router bit therein.

17. The router table of claim 1 wherein said fence means comprises an elongated fence member having an adjustable fence portion disposed between said pivot means and said opening means and adjustment means for selectively adjusting and fixing said fence portion at a set position on said fence member.

18. The router table of claim 17 wherein said adjustment comprises a parallelogram linkage connecting said fence portion on said fence member and a set screw threadably mounted on said fence member to engage said fence portion.

19. The router table of claim 4 further comprising secondary scale means on said fence means for visually indicating the linear distance from said Z axis to said primary scale means.

20. The router table of claim 1 further comprising carriage means, engageable with said fence means for guidance thereby, for securing a small workpiece thereto and for guiding said workpiece into engagement with said router bit.

21. An adapter kit for use with a work table having a router bit projecting thereabove comprising fence means adapted to be mounted on said work table for guiding movements of a workpiece therealong for engagement with said router bit, pivot pin means on said fence means for pivotally mounting said fence means on said work table to permit swinging movements of said fence means to selectively vary the distance between said router bit and said fence means, means comprising a fixed pivot pin mounted adjacent to one end of said fence means.

22. The adapter kit of claim 21 further comprising a slot defined at a pre-set distance from said pivot pin means on an underside and between opposite ends of said fence means.

23. The adapter kit of claim 22 further comprising a replaceable insert mounted on said fence means and defining said slot therethrough.

24. The adapter kit of claim 21 further comprising primary scale means for attachment on said work table to underlie said fence means to visually indicate and closely approximate the distance between said router bit and said fence means.

25. The adapter kit of claim 24 further comprising secondary scale means on said fence means for visually indicating the linear distance from said router bit to said primary scale means.

26. The adapter kit of claim 21 further comprising block means adapted for linear movement on said router table and having micro-adjustment means thereon for selectively pivoting said fence means to slightly vary the position of said fence means on said work table.

27. The adapter kit of claim 21 wherein said fence means has an adjustable fence portion movably mounted thereon and means for selectively adjusting and fixing the relative position of said fence portion on said fence means.

28. The adapter kit of claim 21 further comprising carriage means, engageable with said fence means for guidance thereby, for securing a small workpiece thereto and for guiding said workpiece into engagement with said router bit.

29. A method for making a router table or adapting an existing work table to accommodate an adjustable fence comprising the steps of forming a fence to comprise an elongated fence member having a pivot pin secured thereon, drilling a hole in the platen of a work table, having an opening formed therethrough adapted to receive and expose a router bit above said platen, and pivotally mounting said pin in said hole to permit swinging movements of said fence member over said platen to selectively vary and adjust the distance between said router bit and said fence means.

30. The method of claim 29 further comprising attaching a linear and graduated scale on one side of said platen in underlying relationship relative to said fence member to visually indicate and closely approximate the distance between said router bit and said fence member.

31. The method of claim 29 further comprising mounting a micro-adjustment on said platen to engage and pivot said fence member to slightly vary the position of said fence member on said work table and relative to said opening for said router bit.

32. The method of claim 31 further comprising attaching a linear and graduated scale on one side of said platen in underlying relationship relative to said fence member to visually indicate and closely approximate the distance between said router bit and said fence member.

33. The router table of claim 10 further comprising primary scale means movably mounted on said platen for visually indicating and closely approximating the distance between said router bit and said fence means when said fence means is pivoted about said pivot axis to various positions on said platen, said opening means being positioned between said pivot means and said scale means.

34. A router table comprising a platen forming a horizontally disposed upper surface thereon, opening means formed through said platen for receiving a router bit therethrough projecting vertically above said upper surface, fence means, comprising an elongated fence, mounted on the upper surface of said platen for guiding movements of a workpiece therealong and on said upper surface for engagement with said router bit, and pivot means for removably mounting said fence means of said platen for pivotally mounting said fence means for swinging movement about a vertical pivot axis on the upper surface of said platen to selectively vary and adjust the distance between said opening means and said fence means, slot means, arcuately aligned with said opening means to define an open window through said fence between opposite sides thereof, for permitting swinging movement of said fence over said upper surface and across said opening means without interfering with said router bit, and a replaceable insert removably mounted on said fence and defining said slot means therein.

35. A router table comprising a platen forming a horizontally disposed upper surface thereon, opening means formed through said platen for receiving a router bit therethrough projecting vertically above said upper surface, fence means mounted on the upper surface of said platen for guiding movements of a workpiece therealong and on said upper surface for engagement with said router bit, pivot means for pivotally mounting said fence means for swinging movement about a vertical pivot axis on the upper surface of said platen to selectively vary and adjust the distance between said opening means and said fence means, and primary scale means movably mounted on said platen for visually indicating and closely approximating the distance between said router bit and said fence means when said fence means is pivoted about said pivot axis to various positions on said platen, said opening means being positioned between said pivot means and said primary scale means.

36. A router table comprising a platen forming a horizontally disposed upper surface thereon, opening means formed through said platen for receiving a router bit therethrough projecting vertically above said upper surface, fence means mounted on the upper surface of said platen for guiding movements of a workpiece therealong and on said upper surface for engagement with said router bit, pivot means for pivotally mounting said fence means for swinging movement about a vertical pivot axis on the upper surface of said platen to selectively vary and adjust the distance between said opening means and said fence means, and a router removably mounted beneath said platen and having chuck means centered relative to said opening means for releasably securing a said router bit therein.

37. A router table comprising a platen forming a horizontally disposed upper surface thereon, opening means formed through said platen for receiving a router bit therethrough projecting vertically above said upper surface, fence means mounted on the upper surface of said platen for guiding movements of a workpiece therealong and on said upper surface for engagement with said router bit, and pivot means for pivotally mounting said fence means for swinging movement about a vertical pivot axis on the upper surface of said platen to selectively vary and adjust the distance between said opening means and said fence means, said fence means comprising an elongated fence member having an adjustable fence portion disposed between said pivot means and said opening means and adjustment means for selectively adjusting and fixing said fence portion at a set position on said fence member.

38. A router table comprising a platen forming a horizontally disposed upper surface thereon, opening means formed through said platen for receiving a router bit therethrough projecting vertically above said upper surface, fence means mounted on the upper surface of said platen for guiding movements of a workpiece therealong and on said upper surface for engagement with said router bit, pivot means for pivotally mounting said fence means for swinging movement about a vertical pivot axis on the upper surface of said platen to selectively vary and adjust the distance between said opening means and said fence means, and carriage means, engageable with said fence means for guidance thereby, for securing a small workpiece thereto and for guiding said workpiece into engagement with said router bit.

39. An adapter kit for use with a work table comprising fence means adapted to be mounted on said work table for guiding movements of a workpiece therealong for engagement with a router bit, and pivot pin means on said fence means for pivotally mounting said fence means on said work table to permit swinging movements of said fence means to selectively vary the distance between said router bit and said fence means, said fence means a slot defined at a pre-set distance from said pivot pin means on an underside and between opposite ends of said fence means.

40. An adapter kit for use with a work table comprising fence means adapted to be mounted on said work table for guiding movements of a workpiece therealong for engagement with a router bit, and pivot pin means on said fence means for pivotally mounting said fence means on said work table to permit swinging movements of said fence means to selectively vary the distance between said router bit and said fence means, and primary scale means for attachment on said work table to underlie said fence means to visually indicate and closely approximate the distance between said router bit and said fence means.

41. An adapter kit for use with a work table comprising fence means adapted to be mounted on said work table for guiding movements of a workpiece therealong for engagement with a router bit, and pivot pin means on said fence means for pivotally mounting said fence means on said work table to permit swinging movements of said fence means to selectively vary the distance between said router bit and said fence means, said fence means having an adjustable fence portion movably mounted thereon and means for selectively adjusting and fixing the relative position of said fence portion on said fence means.

42. An adapter kit for use with a work table comprising fence means adapted to be mounted on said work table for guiding movements of a workpiece therealong for engagement with a router bit, pivot pin means on said fence means for pivotally mounting said fence means on said work table to permit swinging movements of said fence means to selectively vary the distance between said router bit and said fence means, and carriage means, engageable with said fence means for guidance thereby, for securing a small workpiece thereto and for guiding said workpiece into engagement with said router bit.

* * * * *